US007460730B2

(12) United States Patent
Pal et al.

(10) Patent No.: US 7,460,730 B2
(45) Date of Patent: Dec. 2, 2008

(54) VIDEO REGISTRATION AND IMAGE SEQUENCE STITCHING

(75) Inventors: Chris Pal, Cambridge (CA); Drew Steedly, Redmond, WA (US); Richard Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 11/197,813

(22) Filed: Aug. 4, 2005

(65) Prior Publication Data

US 2007/0031062 A1   Feb. 8, 2007

(51) Int. Cl.
G06K 9/36 (2006.01)
G06K 9/32 (2006.01)
(52) U.S. Cl. .................. 382/284; 382/276; 382/294; 707/E17.028
(58) Field of Classification Search ................ 382/284, 382/294, 276; 707/E17.028
See application file for complete search history.

(56) References Cited

U.S. PATENT DOCUMENTS

| 5,594,676 | A |   | 1/1997  | Greggain |         |
|-----------|---|---|---------|----------|---------|
| 5,649,032 | A | * | 7/1997  | Burt et al. | 382/284 |
| 6,011,558 | A |   | 1/2000  | Hsieh |         |
| 6,097,854 | A | * | 8/2000  | Szeliski et al. | 382/284 |
| 6,157,747 | A | * | 12/2000 | Szeliski et al. | 382/284 |
| 6,246,413 | B1 |  | 6/2001  | Teo |         |
| 6,259,826 | B1 | * | 7/2001 | Pollard et al. | 382/284 |
| 6,393,054 | B1 |  | 5/2002  | Altunbasak |     |
| 6,559,846 | B1 |  | 5/2003  | Uyttendaele |    |
| 6,597,801 | B1 | * | 7/2003 | Cham et al. | 382/103 |
| 6,636,216 | B1 |  | 10/2003 | Silverbrook |    |
| 6,677,981 | B1 |  | 1/2004  | Mancuso |        |
| 6,701,030 | B1 |   | 3/2004  | Uyttendaele |    |

(Continued)

FOREIGN PATENT DOCUMENTS

WO     WO9739420     10/1997

OTHER PUBLICATIONS

Brown; Lowe. Recognizing panoramas. In Ninth International Conference on Computer Vision (ICCV'03), pp. 1218-1225, Nice, France, Oct. 2003.

(Continued)

Primary Examiner—Samir A Ahmed
Assistant Examiner—Stephen R Koziol
(74) Attorney, Agent, or Firm—Lyon & Harr, LLP; Mark A. Watson

(57) ABSTRACT

A "Keyframe Stitcher" provides an efficient technique for building mosaic panoramic images by registering or aligning video frames to construct a mosaic panoramic representation. Matching of image pairs is performed by extracting feature points from every image frame and matching those points between image pairs. Further, the Keyframe Stitcher preserves accuracy of image stitching when matching image pairs by utilizing ordering information inherent in the video. The cost of searching for matches between image frames is reduced by identifying "keyframes" based on computed image-to-image overlap. Keyframes are then matched to all other keyframes, but intermediate image frames are only matched to temporally neighboring keyframes and neighboring intermediate frames to construct a "match structure." Image orientations are then estimated from this match structure and used to construct the mosaic. Matches between image pairs may be compressed to reduce computational overhead by replacing groups of feature points with representative measurements.

20 Claims, 11 Drawing Sheets
(5 of 11 Drawing Sheet(s) Filed in Color)

U.S. PATENT DOCUMENTS

| | | | |
|---|---|---|---|
| 6,813,391 | B1 | 11/2004 | Uyttendaele |
| 6,985,620 | B2* | 1/2006 | Sawhney et al. .............. 382/154 |
| 2002/0113805 | A1 | 8/2002 | Li |
| 2002/0140829 | A1 | 10/2002 | Colavin |
| 2003/0194149 | A1* | 10/2003 | Sobel et al. ................. 382/284 |
| 2004/0114799 | A1 | 6/2004 | Xu |
| 2004/0233274 | A1 | 11/2004 | Uyttendaele |
| 2006/0120624 | A1* | 6/2006 | Jojic et al. .................. 382/284 |

OTHER PUBLICATIONS

Brown; Szeliski; Winder. Multi-Scale Oriented Patches. Microsoft Technical Report MSR-TR-2004-133, Dec. 2004.

Szeliski. Image alignment and stitching. In N. Paragios et al., editors, Handbook of Mathematical Models in Computer Vision, pp. 273-292. Springer, 2005.

Debevec; Malik. Recovering high dynamic range radiance maps from photographs. pp. 369-378, Aug. 1997.

Irani; Anandian. Video indexing based on mosaic representations. Proceedings of IEEE, May 1998.

Li; Randhawa. 2004. Improved video mosaic construction by selecting a suitable subset of video images. In Proceedings of the 27th Australasian Conference on Computer Science—vol. 26 (Dunedin, New Zealand). Estivill-Castro, Ed. ACM International Conference Proceeding Series, vol. 56. Australian Computer Society; Darlinghurst, Australia, 143-149.

Irani; Hsu; Anandan. "Mosaic Based Representation of Video Sequences and Their Applications," IEEE Proc. Int'l Conf. Computer Vision, pp. 605-611, Jun. 1995.

Irani, Peleg. Improving resolution by image registration. Graphical Models and Image Proc., May 1991.

Irani; Rousso; Peleg. Recovery of ego-motion using image stabilization. In IEEE Conference on Computer Vision and Pattern Recognition, pp. 454-460, Jun. 1994.

Kang; Uyttendaele; Winder; Szeliski. High dynamic range video. ACM Trans. Graph., 22(3):319-325, 2003.

Kang; Weiss. Characterization of errors in compositing panoramic images. Computer Vision and Image Understanding, 73(2):269-280, Feb. 1999.

Koch; Pollefeys; Heigl; Gool; Niemann. Calibration of Hand-held Camera Sequences for Plenoptic Modeling. In Proceedings of the 7th International Conference on Computer Vision (ICCV), pp. 585-591, Corfu, Sep. 1999. IEEE Computer Society Press.

Mann; Picard. Virtual bellows: Constructing high-quality images from video. In First IEEE International Conference on Image Processing (ICIP-94), Austin, TX, pp. 363-367, 1994.

Massey; Bender. Salient stills: Process and practice. IBM Systems Journal, 35(3&4):557-573, 1996.

Nistér. Frame decimation for structure and motion. In Proc. 2nd Workshop on Structure from Multiple Images of Large Environments (SMILE2000) Springer Lecture Notes on Computer Science, 2018:17-34, 2001.

Peleg; Herman. Panoramic mosaics by manifold projection. In IEEE Computer Society Conference on Computer Vision and Pattern Recognition (CVPR'97), pp. 338-343, San Juan, Puerto Rico, Jun. 1997.

Sawhney; Gendel, Bergen; Dixon; Paragano. Videobrush: Experiences with consumer video mosaicing. Proc. IEEE Work-shop on Applications Computer Vision (WACV), pp. 56-62, 1998.

Sawhney; Hsu; Kumar. Robust video mosaicing through topology inference and local to global alignment. In Fifth European Conference on Computer Vision (ECCV'98), pp. 103-119, Freiburg, Germany, Jun. 1998. Springer-Verlag.

Schödl; Szeliski; Salesin; Essa. Video textures. In Computer Graphics (SIGGRAPH'2000 Proceedings), pp. 489-498, New Orleans, Jul. 2000. ACM SIGGRAPH.

Szeliski. Video mosaics for virtual environments. IEEE Computer Graphics and Applications, 16(2):22-30, 1996.

Szeliski; Shum. Creating full view panoramic image mosaics and environment maps. In Proc. of SIGGRAPH, pp. 251-258, 1997.

Triggs; McLauchlan; Hartley; Fitzgibbon. Bundle adjustment—a modern synthesis. In International Workshop on Vision Algorithms, pp. 298-372, Kerkyra, Greece, Sep. 1999. Springer.

Zhu; Hanson; Schultz; Stolle; Riseman. Stereo mosaics from a moving video camera for environmental monitoring, Int. Workshop on Digital and Computational Video, 1999, Tampa, Florida, pp. 45-54.

* cited by examiner

VIDEO REGISTRATION AND IMAGE SEQUENCE STITCHING

BACKGROUND

1. Technical Field

The invention is related to construction of mosaiced panoramic images, and in particular, to a technique for building a "match" structure of image correspondences which is optimized to align the images for "registering" large numbers of images into an underlying panoramic representation having static and/or dynamic components.

2. Related Art

In general, a mosaic panoramic image is an image that has been expanded in one or more dimensions by combining multiple overlapping image frames to generate the panorama. As a result, the panoramic image is typically larger than the size that a conventional image capture device (such as a digital still or video camera) is capable of capturing in a single image frame.

A number of conventional techniques have been developed to generate such panoramic images. For example, the basic approach is to simply take a plurality of regular photographic or video images in order to cover the entirety of the desired viewing space. These images are then aligned and composited into complete panoramic images using any of a number of conventional image "mosaicing" or "stitching" algorithms.

For example, one conventional mosaicing scheme has demonstrated how panoramas contained in a set of unordered images can be automatically identified and stitched. These techniques allow a user to take a number of images with a still camera, identify clusters of images which came from the same panorama, and then stitch each cluster into a panorama. For example, one such scheme first compares "point features" within pairs of images to generate a mesh of matches. A connected component approach is used to identify separate panoramas. Images in each cluster are then aligned by minimizing measurement errors. Lastly, images in each cluster are warped onto a compositing surface and blended to generate the output panorama.

When applied to relatively small data sets, such as a cluster of images captured by a digital still camera, many conventional mosaicing schemes are capable of rapidly stitching related image frames to generate mosaic images. However, when data sets become very large, the generation of mosaics becomes a more complicated process. For example, with a still camera, users typically only take a few or at a few dozen images to create a panorama. However, with a video camera, it is easy to generate thousands of images over a very short period. For example, at a typically video speed of only 30 frames per second, a total of 1800 image frames will be generated in only one minute.

Unfortunately, the matching techniques performed by many mosaicing schemes are often impractical for matching such large numbers of images for generating a single mosaic panorama for those images. Consequently, work has been done to provide efficient techniques for stitching or mosaicing larger data sets such as video recordings. While the idea of stitching panoramas from videos is not new, the way in which such mosaics are constructed, the underlying camera motion models employed, and the details of the algorithms vary considerably.

For example, one conventional scheme for generating mosaic images from video sequences uses an affine motion model for an image resolution enhancement application as a function of received video frames. Another conventional video mosaicing scheme uses an eight parameter perspective transformation model. Yet another conventional video mosaicing scheme uses a "manifold projection" approach in combination with a simple translation only camera motion model. This approach results in a fast algorithm for video stitching in which narrow strips of pixels from the underlying scene are used to form a composite panoramic image. Further, the use of a translation only camera model avoids the necessity of computing more complex 3D camera motions as do a number of conventional mosaicing schemes.

Other conventional video stitching schemes operate by initially only stitching together adjacent frames of the video sequence, thereby making the matching problem linear in the number of images. However, such techniques ignore matches due to the camera crossing back over its path. By not including these matches, components of the panorama can drift due to error accumulation. However, some conventional mosaicing schemes partially compensate for this problem by interleaving the matching process and alignment process. Specifically, after each new image is aligned to its temporal neighbor, spatial neighbors are identified and used to refine the orientation estimate of the new image.

A similar interleaved matching strategy was employed by another conventional mosaicing scheme which generates image structure from motion analysis. In other conventional structure from motion work, a strategy for frame "decimation" is presented for the extraction of structure and motion from hand held video sequences. This strategy identifies "unnecessary" frames for removal from subsequent computation by using a sharpness measure to order frames for consideration for removal as a function of a global motion model. A threshold based on a motion correlation coefficient is then employed. This strategy is employed as a preprocessing step within a larger system for structure from motion in which a tree of trifocal tensors is used. However, one problem with such schemes is that data is lost whenever "unnecessary" image frames are discarded.

Another conventional video mosaicing scheme generally operates by interleaving image matching and orientation estimation steps by making the assumption that temporally adjacent images are spatially adjacent. This scheme also makes the assumption that any loops in the camera path are small enough that accumulated error, or drift, can be ignored. However, such assumptions can be considered overly restrictive in that they constrain the ability of users to capture video recordings. Further, this scheme does not directly handle breaks in the matching, as would occur with multiple videos of the same panorama. In addition, such interleaving of the matching and alignment requires that the images be aligned in the same order as the video.

Another problem with the application of automatic high-quality stitching to video sequences is the relatively high computational costs associated with stitching large numbers of images, and the resulting simplifications in motion models or restrictive assumptions required to make such algorithms run in a reasonable time. Existing methods for constructing large panoramas in a "batch" fashion from static images can be quite robust. However, they are typically not sufficiently efficient for aligning and stitching all the frames of a high quality video sequence in a reasonable amount of time. While fast techniques do exist for stitching video, such methods typically use more restricted motion models and produce final panoramic representations that are less accurate than static image-based batch processing approaches.

At least one conventional video mosaicing scheme partially addresses some of these issues. For example, one conventional scheme, referred to as "VideoBrush™," provides a near-real-time preview of a panoramic image constructed from images captured by a video camera. In general, the VideoBrush™ system provides techniques for 1D and 2D video mosaicing using parametric alignment which includes videos captured with an approximately fixed camera location, or an arbitrarily moving camera capturing an approximately planar scene. As a result, users are constrained in how they capture videos for use by this conventional technique.

Another problem with many conventional mosaicing schemes is that they operate using post-hoc processing of recorded images after the entire set of images has been captured. As a result, one problem is that the user never really knows for sure that sufficient coverage of the scene has been achieved to ensure that the desired panorama can be constructed from the set of captured image frames until the panorama has actually been generated at some later time. As a consequence it can be hard for users to see "the big picture."

In particular, using conventional image stitching schemes, it is not until the images are uploaded from the camera to the computing device (such as a PC-type computer, or the like) that users find that the resulting panorama is flawed. For example, gaps will occur in the panorama if users miss one or more spots. Gaps will also occur if the stitching program is unable to insert one or more of the captured images into the panorama, e.g., due to too little overlap between pictures, due to a lack of texture, due to problems with image focus (image too blurry), etc. Further, while gaps at the edge of a panorama can be removed by cropping the panorama, this may cause other desired image elements to be lost outside the cropping boundaries. In the worst case, what was intended to be a single panorama can end up as multiple unconnected (and odd-shaped) pieces of the overall image.

Yet another problem with conventional post-processing approaches involves the issue of "ghosting" where objects have moved from one frame to the next while the images for the panorama were being taken. While users may be able to identify flaws within a picture (e.g., out of focus) using the view finder, and retake it, flaws between photos, such as ghosting or differences in lighting etc. are less likely to be discovered while shooting. Unfortunately, by the time users notice such flaws, it is typically too late to retake the missing or flawed image frames.

Users can reduce the risk of flaws such as gaps and ghosting by using a larger overlap between images and by taking multiple copies of areas suspected of being subject to ghosting. This redundancy-based approach, however, is costly in terms of time and especially in terms of storage space (as more pictures are taken) and it still cannot guarantee successful generation of the resulting panoramic images.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Keyframe Stitcher" provides an efficient technique for building mosaic panoramic images by registering or aligning sequences of image frames into an underlying panoramic representation. The techniques provided by the Keyframe Stitcher are scalable such that large panoramas may be easily constructed by registering large numbers of sequential image frames, such as image sequences captured by still or video cameras, or other image sources. Further, in various embodiments, the Keyframe Stitcher is sufficiently optimized to allow for real-time, or near-real-time, stitching of images. Consequently, users are able to "brush" a scene with a camera to create mosaic images of the scene in real-time as the images are being captured. Consequently, users are also able to correct errors or gaps in the resulting panorama by simply brushing over any areas of the mosaic exhibiting problems.

In general, in one embodiment, the Keyframe Stitcher operates by extracting "features" or "interest points" from every new image frame, with a first image frame being identified as a "keyframe." Each subsequent frame is then matched (via the features) to the previous frame and to the preceding keyframe. New keyframes are then identified from the incoming image frames whenever an estimated frame overlap drops below a minimum overlap threshold. Alternately, if a predetermined maximum number of frames has been exceeded without identifying a new keyframe as a function of image frame overlap, then the current frame is identified as a new keyframe.

Then, each frame is also matched to the next or "forward" keyframe. Every keyframe is then matched to all other keyframes to construct a keyframe "mesh." All of the match measurements between images frames, image frames and keyframes, and between keyframes are then used to construct an image "match structure." This match structure is then used to estimate optimal image orientations for the image frames, with the image orientations then being used to construct the image mosaic from the sequence of image frames.

In other words, the Keyframe Stitcher allows a very large number of image frames to be aligned in real-time or near-real-time by building a "match structure" of image correspondences which is then optimized to align the images. Note that in one embodiment, optimization of image correspondences is accomplished using bundle adjustment techniques. Further, in one embodiment, assuming that there is finite number of keyframes, "real-time" construction of mosaic images is provided while images are being captured by performing incremental optimization of "blocks" of images corresponding to keyframe pairs.

As noted above, the Keyframe Stitcher described herein provides an efficient technique for building static mosaic panoramic images. In addition, the Keyframe Stitcher is also capable of outputting intermediate "warped" video frames which are mapped as "overlays" to the static panorama. Consequently, the Keyframe Stitcher is capable of constructing "animated panoramas" for action sequences occurring within a scene. In this scenario the user can construct a "background panorama" by panning across a scene. Then, any action occurring within a particular part of the overall mosaic scene can be filmed and the resulting warped images can be inserted as overlays into the static panorama, producing an "animated panorama." One advantage of this option is that it allows for large compression of video images by creating a static portion of a video sequence, and only animating the relatively smaller portions wherein action is occurring.

In view of the above summary, it is clear that the Keyframe Stitcher described herein provides a unique system and method for generating still and/or animated panoramic mosaic images of a scene. In addition to the just described benefits, other advantages of the Keyframe Stitcher will become apparent from the detailed description which follows hereinafter when taken in conjunction with the accompanying drawing figures.

DESCRIPTION OF THE DRAWINGS

The patent or application file contains at least one drawing executed in color. Copies of this patent or patent application publication with color drawing(s) will be provided by the Office upon request and payment of the necessary fee.

The specific features, aspects, and advantages of the present invention will become better understood with regard to the following description, appended claims, and accompanying drawings where:

DETAILED DESCRIPTION

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
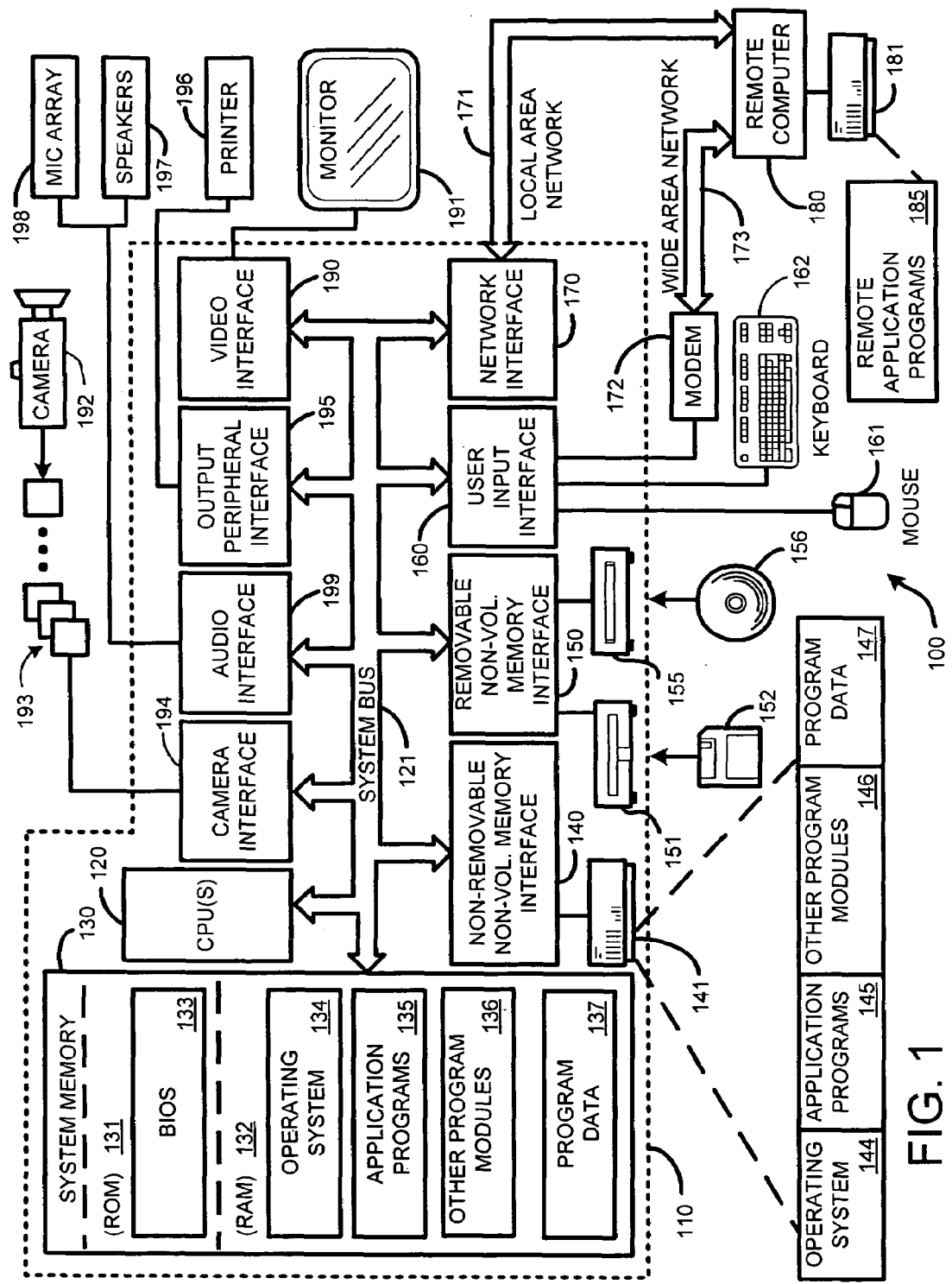
FIG. 1 is a general system diagram depicting a general-purpose computing device constituting an exemplary system for implementing a Keyframe Stitcher, as described herein.
Figure 2:
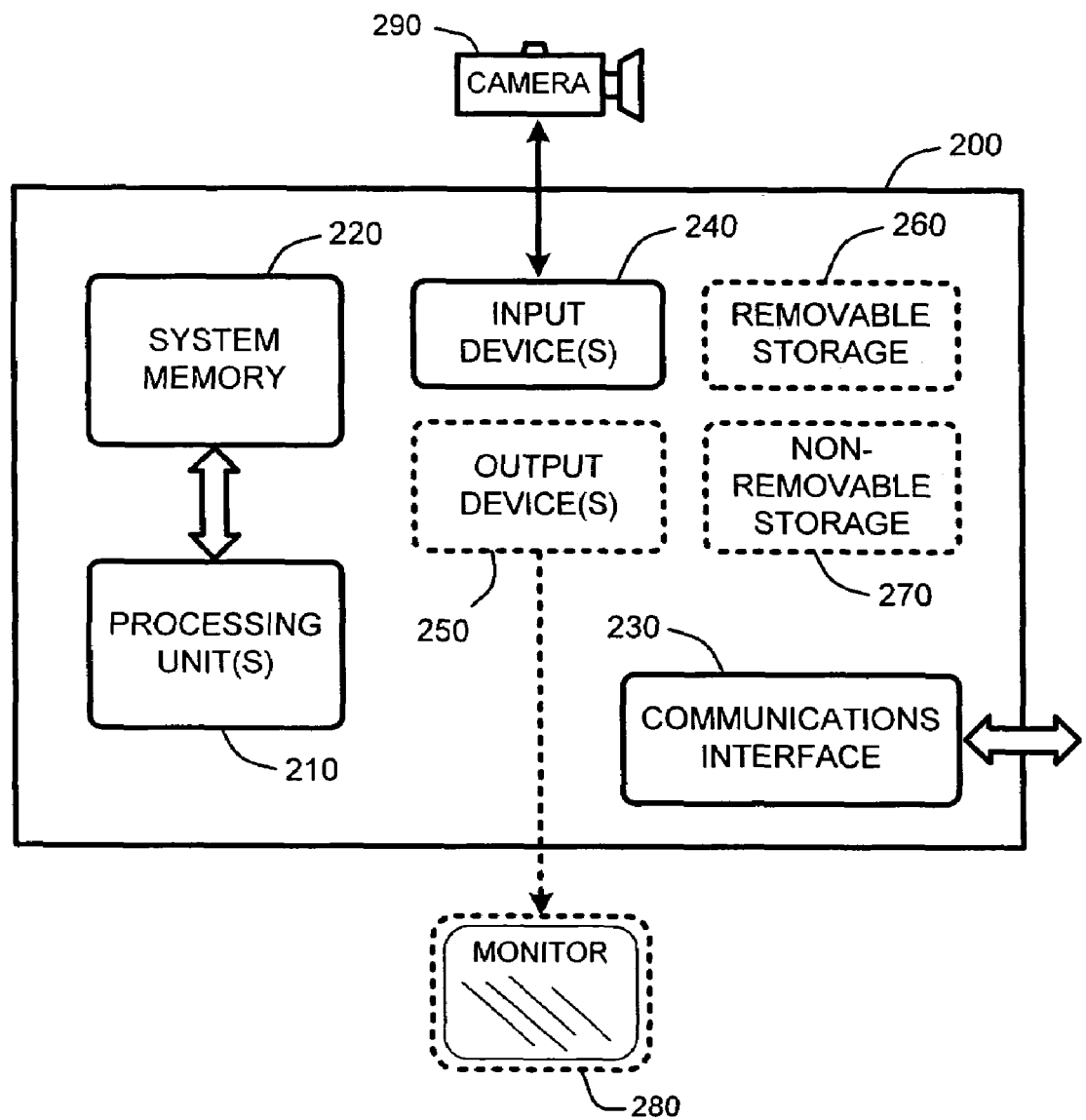
FIG. 2 is a general system diagram depicting a general computing device having simplified computing and I/O capabilities for use with a digital camera or other image input source for implementing a Keyframe Stitcher, as described herein.
Figure 3:
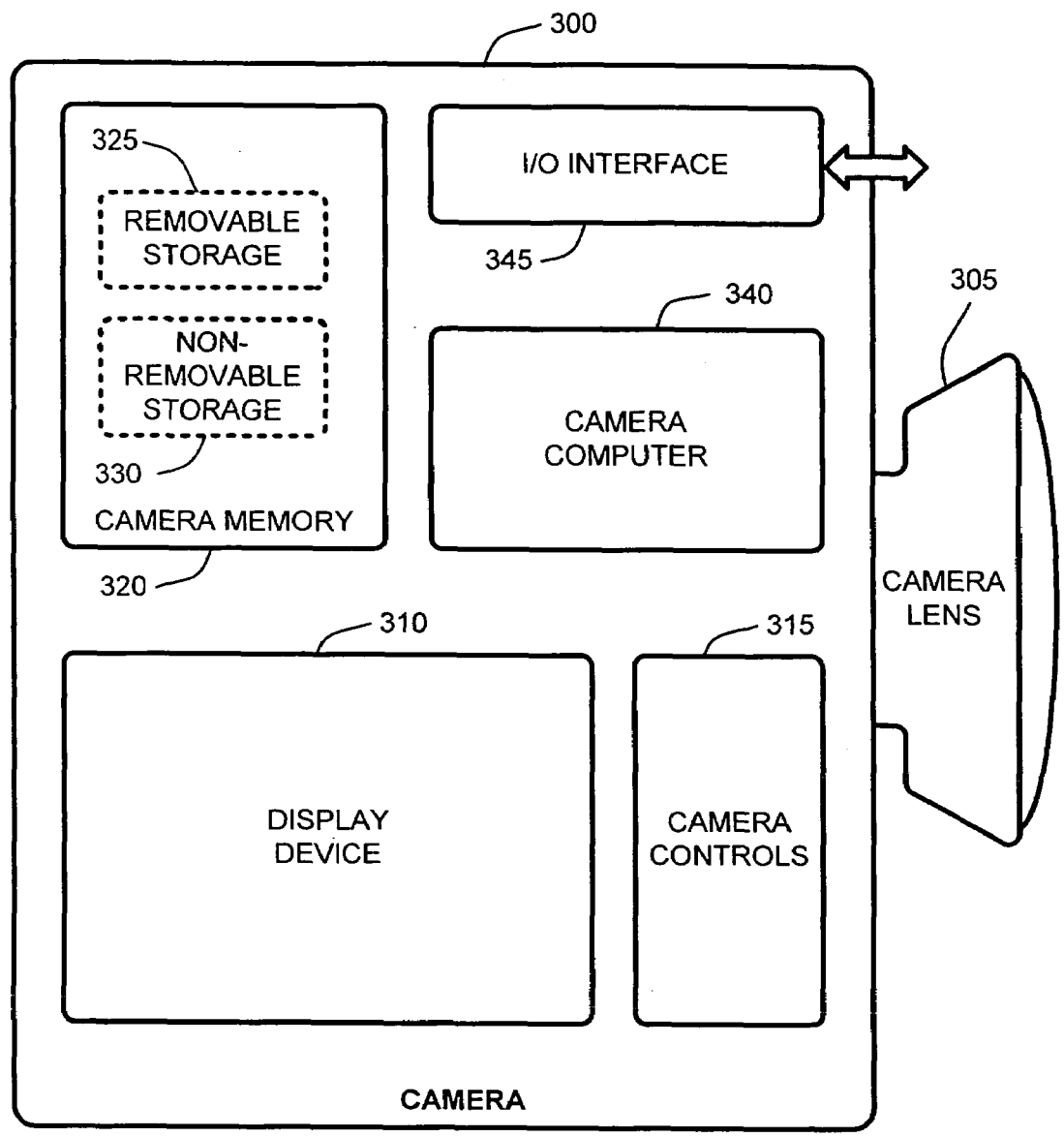
FIG. 3 is a general system diagram depicting a digital camera having integrated computing and I/O capabilities and an integral display screen for implementing a Keyframe Stitcher, as described herein.

1.0 Exemplary Operating Environments:

FIG. 1, FIG. 2, and FIG. 3 illustrate various examples of suitable computing environments on which various embodiments and of a "Keyframe Stitcher," as described herein, may be implemented.

For example, FIG. 1 illustrates an example of a general computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor 191, computers may also include other peripheral output devices such as a printer 196, which may be connected through an output peripheral interface 195.

Further, the computer 110 may also include, as an input device, a camera 192 (such as a digital/electronic still or video camera, or film/photographic scanner) capable of capturing a sequence of images 193. Further, while just one camera 192 is depicted, multiple cameras of various types may be included as input devices to the computer 110. The use of multiple cameras provides the capability to capture multiple views of an image simultaneously or sequentially, to capture three-dimensional or depth images, or to capture panoramic images of a scene. The images 193 from the one or more cameras 192 are input into the computer 110 via an appropriate camera interface 194 using conventional wired or wireless interfaces, including, for example, USB, IEEE 1394, Bluetooth™, IEEE 802.11, etc. This interface is connected to the system bus 121, thereby allowing the images 193 to be routed to and stored in the RAM 132, or any of the other aforementioned data storage devices associated with the computer 110. However, it is noted that previously stored image data can be input into the computer 110 from any of the aforementioned computer-readable media as well, without directly requiring the use of a camera 192.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

With respect to FIG. 2, this figure shows a general system diagram showing a simplified computing device coupled to a digital still or video camera. Such computing devices can typically be found in devices having at least some minimum computational capability in combination with a communications interface. Examples of well known simplified computing systems, environments, and/or configurations that may be suitable for use with the invention include, but are not limited to, hand-held, laptop or mobile computers, communications devices such as cell phones and PDA's, etc.

It should be noted that any boxes that are represented by broken or dashed lines in FIG. 2 represent alternate embodiments of the simplified computing device, as described herein, and that any or all of these alternate embodiments, as described below, may be used in combination with other alternate embodiments that are described throughout this document.

At a minimum, to enable a computing device to implement the "Keyframe Stitcher" (as described in further detail below), the computing device 200 must have some minimum computational capability and a wired or wireless interface 240 for connecting a digital camera 290 or other image input source.

In particular, as illustrated by FIG. 2, the computational capability of the computing device 200 is generally illustrated by processing unit(s) 210 (roughly analogous to processing units 120 described above with respect to FIG. 1), and system memory 220. Note that in contrast to the processing unit(s) 120 of the general computing device of FIG. 1, the processing unit(s) 210 illustrated in FIG. 2 may be specialized (and inexpensive) microprocessors, such as a DSP, a VLIW processor, or other micro-controller rather than the general-purpose processor unit of a PC-type computer or the like, as described above.

In addition, the simplified computing device 200 of FIG. 2 may also include other components, such as, for example connections for one or more input devices 240 (analogous to the input devices described with respect to FIG. 1. The simplified computing device of FIG. 2 may also include other optional components, such as, for example one or more output devices 250 (analogous to the output devices described with respect to FIG. 1), such as an external display device 280. Finally, the simplified computing device of FIG. 2 may also include removable and/or non-removable storage, 260 and 270, respectively (analogous to the storage devices described with respect to FIG. 1).

Finally, with respect to FIG. 3, this figure is a general system diagram depicting a digital camera 300 having integrated computing 340 and I/O capabilities 345, and a display device 310, such as an LCD screen, for implementing a Keyframe Stitcher, as described herein.

In general, as is well known to those skilled in the art, conventional digital cameras include components such as those described above (e.g., I/O, computing, and display), in addition to camera memory 320 that is either removable 325 or non-removable 330. Such cameras also include a lens 305 and a set of one or more controls 315. Further, as with the simplified computing device described with respect to FIG. 2, the computing capability 340 of the digital camera can be implemented using low cost specialized processors, such as a DSP, a VLIW processor, or other micro-controller rather than the general-purpose processor unit of a PC-type computer or the like, as described above with respect to FIG. 1. As described in further detail below, these components are used in combination to enable the real-time functionality of the Keyframe Stitcher in a standalone digital camera.

The exemplary operating environments having now been discussed, the remaining part of this description will be devoted to a discussion of the program modules and processes embodying the "Keyframe Stitcher."

2.0 Introduction:

A "Keyframe Stitcher" provides an efficient technique for building mosaic panoramic images by registering or aligning sequences of image frames into an underlying panoramic representation. The techniques provided by the Keyframe Stitcher are scalable such that large panoramas may be easily constructed by registering large numbers of sequential image frames, such as image sequences captured by still or video cameras, or other image sources. Further, in various embodiments, the Keyframe Stitcher is sufficiently optimized to allow for real-time, or near-real-time, stitching of images. Consequently, users are able to "brush" a scene with a camera to create mosaic images of the scene in real-time as the images are being captured.

It should be noted that these real-time embodiments of the Keyframe Stitcher may be implemented within a standalone video camera or the like having integral displays for rendering the mosaic panoramic images as they are created. Similarly, the Keyframe Stitcher may also be implemented on an external display device, either coupled directly to the digital camera, or coupled to the digital camera via a separate computing device. However, in each of these cases, the Keyframe Stitcher described herein operates in essentially the same way.

Consequently, while the Keyframe Stitcher will be generally described herein as being implemented within a computing device, such as, for example, a PC-type computer performing post-processing of image sequences after those sequences have been captured, it should be understood the detailed description of the Keyframe Stitcher provided herein applies equally to the additional embodiments involving external display devices and/or external computing devices, or cameras within which the Keyframe Stitcher is implemented directly, so as to provide for real-time generation of mosaic panoramas.

2.1 System Overview:

As noted above, the Keyframe Stitcher described herein provides an efficient image mosaicing technique which allows for either real-time or offline stitching of a sequence of images from a set of images of a scene to generate mosaic panoramas, and for generation of animated mosaic panoramas.

In general, in one embodiment, the Keyframe Stitcher performs the following steps for registering and aligning images for generating mosaics:

1. First, the Keyframe Stitcher extracts "features" or "interest points" from every new image frame, with a first image frame and a last image frame being identified as a "keyframes."
2. Each subsequent frame is matched (via the features) to the previous frame and to the immediately preceding keyframe.
3. New keyframes are identified from the incoming image frames whenever an estimated frame overlap drops below a minimum overlap threshold.
    a. Alternately, if a predetermined maximum number of frames has been exceeded without identifying a new keyframe as a function of image frame overlap, then the current frame is identified as a new keyframe.
4. Each frame is also matched to the next or "forward" keyframe.
5. Every keyframe is then matched to all other keyframes to construct a keyframe "mesh."
6. All of the match measurements (i.e., the "match structure") between images frames, image frames and keyframes, and between keyframes are then used to estimate optimal image orientations (including scalings, warpings, rotations, etc) for the image frames, with the image orientations then being used to construct the image mosaic from the sequence of image frames.

Note that in constructing the image mosaics from the estimated optimal orientations of the image frames, conventional image stitching techniques are used to combine overlapping image segments, including, for example, conventional blending, feathering, contrast and brightness adjustments, de-ghosting operations, etc.

As noted above, in one embodiment, the Keyframe Stitcher is used to generate "animated mosaics" wherein a static mosaic background is generated, and action shots occurring within sequences of additional frames corresponding to sub-regions of the overall mosaic are warped and mapped to the overall mosaic to generate an "animated panorama" having both static and dynamic components blended into an overall mosaic panorama.

In this embodiment, the camera is generally panned over the scene to build a "background" mosaic followed by one or more "action shots" from within subsections of the overall mosaic. However, in this case, processing of the additional frames for the action shots differs somewhat from the general approach summarized above for construction of the static mosaic panorama.

In particular, the static background of animated mosaic panorama is constructed in exactly the same manner as described above. However, the sequence of "live" frames (i.e., "action shots") are then added as a dynamic overlay to the static mosaic to create an animated mosaic by registering each action shot to only the "keyframe mesh" of the mosaic panorama rather than to the entire "match structure." One reason that registration to the keyframe mesh is used rather than registration to the entire match structure is that because of the "action" occurring within the sequence of frames representing the action shot it is likely that the frames of the action shot will not match the intermediate frames between keyframes very well.

Note that in "registering" the frames of the action shots, those frames are warped, scaled rotated, etc., as necessary, to fit into the overall mosaic. Further, as with the generation of the static mosaic described above, after registering the frames of the action shot to the overall mosaic, conventional image stitching techniques are used to combine overlapping image segments, including, for example, conventional blending, feathering, contrast and brightness adjustments, de-ghosting operations, etc.

Finally, in yet another embodiment, as noted above, the Keyframe Stitcher is used to provide for real-time or near-real-time image stitching so as to generate mosaic panoramas while a user moves a camera over a scene. In this case, rather than processing the entire video stream, to generate the complete match structure prior to constructing the mosaic panorama, optimal image orientations are estimated for "blocks" of images corresponding to neighboring keyframe pairs to provide for near-real-time incremental construction of mosaic images.

One advantage of this embodiment is that it allows for a near-real-time display of the mosaic panorama to be displayed to the user as the images are being captured. For example, as the user pans a video or still camera over a scene, and captures images of that scene, the corresponding mosaic panorama can be displayed in real-time on the LCD-type display screen or viewfinder window of that digital still or video camera. Clearly, this real-time embodiment may also be implemented on an external display device coupled to the camera, either directly, or via an external computing device to which the camera is itself coupled.

However, each of these embodiments of the Keyframe Stitcher operate in an identical manner, with respect to generation of mosaic panoramas, and differ only in the hardware and hardware connections used for that purpose. Consequently, for purposes explanation, the following discussion of the Keyframe Stitcher will assume that the Keyframe Stitcher is implemented in a PC-type computer having a video stream input source from either a live or recorded camera input. However, it should be understood that the Keyframe Stitcher described herein is intended to encompass each of the aforementioned embodiments and implementations.

Figure 4:
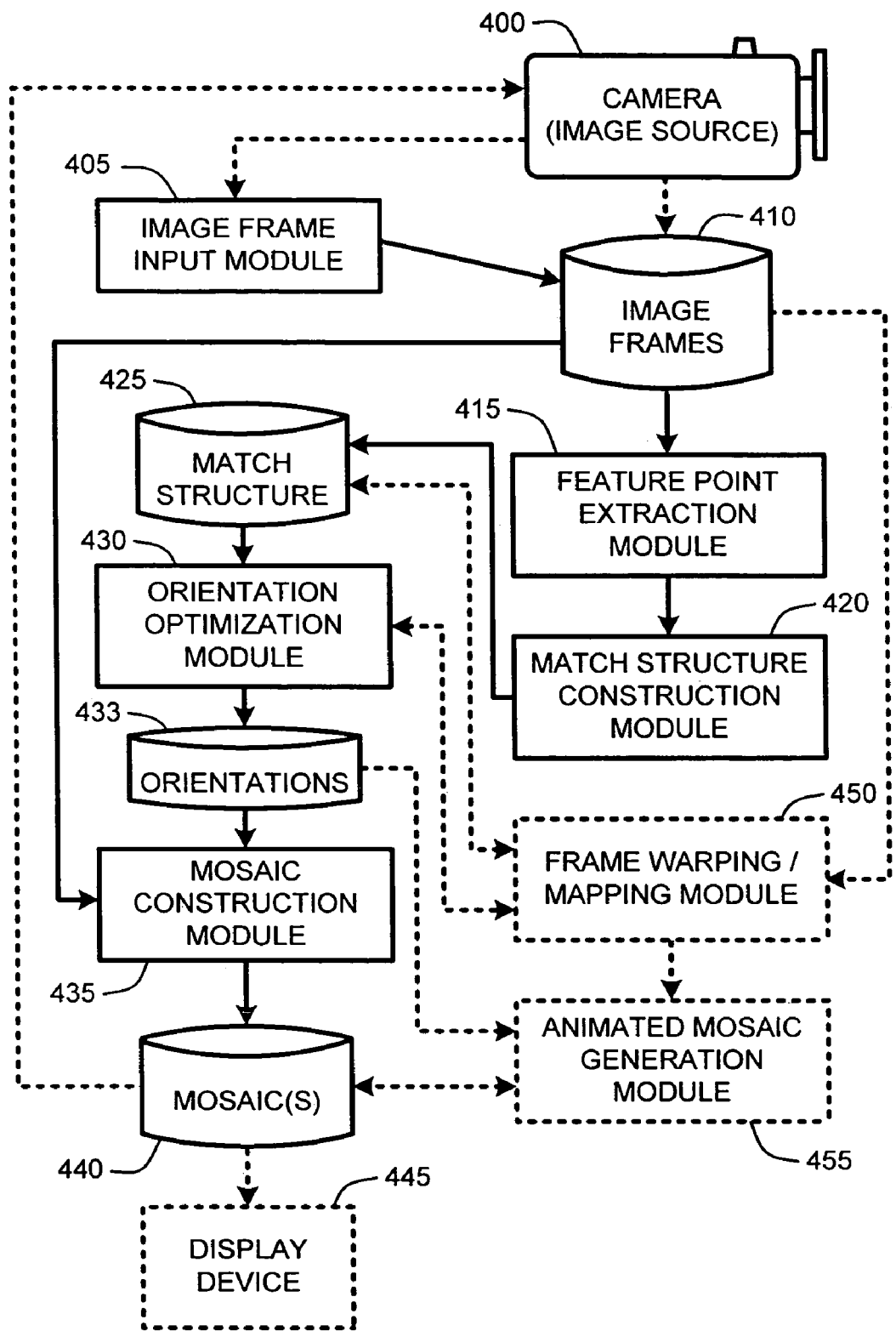
FIG. 4 illustrates an exemplary architectural system diagram showing exemplary program modules for implementing a Keyframe Stitcher, as described herein.

2.2 System Architectural Overview:

The processes summarized above are illustrated by the general system diagram of FIG. 4. In particular, the system diagram of FIG. 4 illustrates the interrelationships between program modules for implementing the Keyframe Stitcher, as described herein.

It should be noted that any boxes and interconnections between boxes that are represented by broken or dashed lines in FIG. 4 represent alternate embodiments of the Keyframe Stitcher described herein, and that any or all of these alternate embodiments, as described below, may be used in combination with other alternate embodiments that are described throughout this document. Further, it should also be noted that for purposes of clarity of explanation, the Keyframe Stitcher illustrated in FIG. 5 shows a camera or image source 400 as being external to the overall system of the Keyframe Stitcher. However, as noted above, in various embodiments, some or all of the components and program modules illustrated in FIG. 4 may be integral to the camera 400.

In general, as illustrated by FIG. 4, the Keyframe Stitcher generally begins operation by providing images either directly from a still or video camera 400 or other image input source to an image frame input module 405 which saves the image files 410 for use by the Keyframe Stitcher. Alternately, the Keyframe Stitcher can operate on a set of prerecorded images files 410, such as a video recording or other image sequence.

Once the image files 410 are available to the Keyframe Stitcher, a feature point extraction module 415 analyses each image frame and extracts a set of image features from each image frame. These extracted features are then provided to a match structure construction module 420 which acts to identify keyframes in the images 410 and build a "match structure" 425 which generally represents: 1) correspondences between keyframes (i.e., a "keyframe mesh"), 2) correspondences between intermediate frames between the neighboring keyframes, and 3) correspondences between the intermediate frames and their neighboring keyframes on either side of those intermediate frames.

In general, the aforementioned feature point extraction module 415 will typically extract several hundred features from each image, resulting in hundreds of matches between matched image pairs with large overlaps (and therefore a substantially larger "match structure"). If the matched features are well distributed across the image, this strongly constrains the relative orientations of the images. However, the large number of measurements is a computational bottleneck for many image sequences. Consequently, in one embodiment, as described in further detail in Section 3.5, the match structure construction module acts to replace the measurements between pairs of images with a much smaller number of "representative measurements" so as to reduce the computational overhead required for generation of image mosaics.

In either case, once the match structure 425 has been completed, it is provided to an orientation optimization module 430 which analyzes the match structure to determine optimal "orientations" 433 for each image. In general, these optimal orientations 433 represent estimates of "camera orientations," such as, for example, focal lengths, camera rotations, etc.

These orientations 433 are then translated back to the images for use by a mosaic construction module 435 which uses the orientations 433 for "registration" of the images 410 by rotating, scaling, and warping the images, as necessary to fit the mosaic. Specifically, given the optimized image orientations 433, the mosaic construction module 435 operates to build a mosaic panorama 440 from the image frames 410 as a function of the optimized image orientations. Note that in one embodiment, construction of the mosaic 440 by the mosaic construction module further includes the use of conventional image blending techniques, including, for example, feathering, contrast and brightness adjustments, de-ghosting operations, etc.

Once the mosaic construction module 435 has completed the mosaic 440, in various embodiments, the mosaic 440 is simply stored for later use, displayed on a conventional display device 445, or provided back to the display of the digital still or video camera 400 used to capture the images for use in real-time previews of the mosaic.

As noted above, in a related embodiment, the Keyframe Stitcher acts to provide for mosaic panorama generation in real-time so that users can see on the display device coupled to, or integrated with, their camera exactly what the completed panorama will look like. In this embodiment, construction of the mosaic proceeds as described above. However, rather than process the entire set of image frames 410 at once, the image frames are processed as they are received (such as from the real-time camera 400 input) by processing "blocks" of intermediate image frames bounded by two immediately neighboring keyframes. Consequently, the maximum delay for generation of the real-time mosaic images is on the order of about the time period from one keyframe to the next.

In another embodiment, also as noted above, the Keyframe Stitcher acts to build animated panoramas having both static and dynamic components. In general, once the underlying mosaic has been constructed by the mosaic construction module 435, additional sequential image frames representing an "action shot" are registered with the keyframe mesh portion of the match structure 425 by a frame warping/mapping module 450.

Specifically, as with the generation of the underlying mosaic, optimal orientations 433 of the image frames 410 representing the action shot are computed by the orientation optimization module 430. However, these action shot orientations 433 are computed only with respect to the keyframe mesh portion of the match structure 425, rather than the entire match structure. These action shot orientations 433 are then used by the frame warping/mapping module 450 to register the images 410 representing the action shot by rotating, scaling, and warping the images, as necessary to fit onto the mosaic.

Finally, an animated mosaic generation module 455 then uses conventional image stitching techniques to overly the registered image frames of the action shot onto underlying mosaic by applying conventional blending, feathering, contrast and brightness adjustments, de-ghosting operations, etc. on a frame by frame basis. The resulting animated mosaic is then stored 440 for later use as desired, or provided for playback via the display device 445.

Further, it should be noted that unlike the underlying mosaic which represents a single composite of all of the frames used to construct the mosaic 440, the animated mosaic generated by the animated mosaic module 455 will generate an animation that shows each frame of the action shot in order, as a sequential mapping of frames. In other words, the animated mosaic sequentially shows each frame of the action shot on the underlying mosaic, while removing each frame of the action shot from the underlying mosaic prior to showing the next sequential frame of the action shot on the underlying mosaic.

Note that this same technique for generating animated mosaics can be used to provide compression of video sequences by constructing a single static mosaic of unmoving or static portions of the video sequence, and then extracting and mapping the moving or dynamic portions of the video sequence to the underlying static mosaic in the same manner as described above. In this case, redundant information in the frames used to construct the underlying mosaic is simply discarded, and only the dynamic elements representing the extracted action shots are kept along with the underlying mosaic. As a result, the resulting animated mosaic can provide significant compression ratios relative to the original video sequence, depending upon the content of the original video sequence. Note that identification and extraction of dynamic regions of a video sequence is a concept that is well known to those skilled in the art, and will not be described in detail herein.

3.0 Operation Overview:

The above-described program modules are employed for implementing the Keyframe Stitcher described herein. As summarized above, this Keyframe Stitcher provides an efficient image mosaicing technique which allows for real-time stitching of a sequence of images from a set of images of a scene to generate mosaic panoramas, and for generation of animated mosaic panoramas. The following sections provide a detailed discussion of the operation of the Keyframe Stitcher, and of exemplary methods for implementing the program modules described in Section 2.

In particular, the following sections present an automatic and efficient method to register and stitch potentially many thousands of video frames into a large panoramic mosaic. The techniques provided by the Keyframe Stitcher preserves the robustness and accuracy of image stitchers that match all pairs of images while utilizing the ordering information inherent in video recordings. In one embodiment, the computational cost of searching for matches between video frames is reduced by adaptively identifying key frames based on the amount of image-to-image overlap. Keyframes are matched to all other key frames, but intermediate video frames between keyframes are only matched to temporally neighboring key frames and other neighboring intermediate frames. Image orientations are then estimated from this sparse set of matches. Additionally, in another embodiment, the matches between pairs of images are compressed by replacing measurements within small windows in the image with a single representative measurement thereby substantially reducing the time required to estimate the image orientations with minimal loss of accuracy.

3.1 Operational Details of the Panoramic Viewfinder:

The following paragraphs detail specific operational embodiments of the Keyframe Stitcher described herein. In particular, the following paragraphs describe cameras and input images for use with the Keyframe Stitcher; operational considerations; feature extraction and image matching; efficient match structures; match structure compression; and computational overhead.

3.2 Cameras and Image or Video Streams:

As noted above, in one embodiment, the Keyframe Stitcher is embodied within a digital still or video camera which has sufficient integrated computing power to generate real-time mosaic previews. However, in addition to implementing the Panoramic Viewfinder within a digital still or video camera, any of a number of conventional camera types or video feeds may be used in combination with the Panoramic Viewfinder.

In fact, virtually any digital camera or video stream feed which is capable of being interfaced with an external computing device, and by extension to the Keyframe Stitcher, may be used. Further, many newer still or video cameras can be connected directly to a computer's existing ports (USB interfaces, IEEE 1394 interfaces, Bluetooth™ wireless interfaces, IEEE 802.11 wireless interfaces, etc). Any such camera can be used by the Keyframe Stitcher.

Further, if the functionality of the Keyframe Stitcher is not integral to the camera, the Keyframe Stitcher can be instantiated on any computing device having sufficient computing power in the same manner as if the Keyframe Stitcher were implemented within a digital camera for real-time generation of mosaic panoramas. For example, a user can use a conventional "web cam" or the like (having no integral computational capabilities), connected to a desktop, notebook, or handheld computing device, to generate mosaic panoramic images in basically the same manner as if captured by a dedicated digital camera having integrated Keyframe Stitcher capabilities.

However, as noted above, rather than describe every possible combination of an external camera or image source connected to a separate computing device for enabling the Keyframe Stitcher, the Keyframe Stitcher will be generally described herein as being implemented within a conventional computing device for processing image sequences for generation of mosaic images. However, it should be understood the detailed description of the Keyframe Stitcher provided herein applies equally to the additional embodiments involving integration into digital cameras, and external computing devices coupled to cameras which may or may not include integral display devices or computing capabilities.

3.3 Operational Considerations:

In contrast to many conventional mosaicing techniques, the Keyframe Stitcher does not eliminate frames from computational consideration. Rather, the Keyframe Stitcher matches intermediate frames to adaptively selected key frames. Further, in contrast conventional video mosaicing techniques that require limited or constrained camera motions, the Keyframe Stitcher provides an efficient mosaicing method which is generally applicable to a large number of camera motion models, such as, for example, 2D similarities, 3D rotations, affine warps and full homographies, to name only a few such motion models. Consequently, the mosaicing approach provided by the Keyframe Stitcher can be used to obtain a robust, globally consistent alignment of many thousands of frames from a video sequence.

Further, to allow real-time or near-real-time performance of the Keyframe Stitcher, it must be assumed that there is a finite bound on the total number of keyframes. One reasonable way is to assume that the entire mosaic will fit in local memory (i.e. the Keyframe Stitcher is not mosaicing an infinite plane, but rather, it is mosaicing a rotational panorama or a limited extent plane). This means that the entire panorama can be covered by a finite number of keyframes.

In one embodiment, as noted above, new keyframes are only created when a current frame doesn't overlap the immediately previous keyframe by some minimum threshold amount. However, to guarantee that there always will be a finite number of keyframes for a rotational panorama or a limited extent plane, in a closely related embodiment, new keyframes are created only when the current frame doesn't overlap any prior keyframe by some threshold (instead of just the preceding keyframe).

For example, if a user pans the camera back and forth over the same portion of a scene several times, there can be several keyframes that overlap the same portion of the resulting mosaic. For an unlimited number of image frames, this means the number of keyframes may be unbounded. However, to handle an unlimited number of image frames, the number of keyframes needs to be bounded by a constant (since the computational cost is cubic in the number of keyframes, as described in further detail in Section 3.7).

As noted above, for rotational panoramas or for panoramas constructed from a limited extent plane, a finite number of keyframes can cover the entire compositing surface for any chosen overlap threshold. Therefore, the number of keyframes can be bounded by only creating new keyframes when they don't overlap any other keyframe by some threshold (instead of just the immediately preceding keyframe). One simple way to make this determination is to simply check the number of feature point matches between the current frame and all keyframes.

Furthermore, in additional embodiments, the Keyframe Stitcher can be made more robust by determining whether matches between feature points are geometrically plausible. This can be done by re-estimating the keyframe orientations each time a new keyframe is added. This also enables the production of a real-time panoramic preview. For instance, the keyframes could be warped to the compositing surface, blended and displayed.

3.4 Feature Extraction and Image Matching:

In a tested embodiment of the Keyframe Stitcher, conventional Multiscale Oriented Patches (MOPS) were extracted from each frame to provide the features for the subsequent image matching. As is known to those skilled in the art, MOPS provide a type of invariant feature located at Harris corners in discrete scale-space and oriented using a blurred local gradient. MOPS are extracted from images by defining a rotationally invariant frame in which a feature descriptor consisting of an 8×8 patch of bias/gain normalized intensity values is sampled. The density of features in the image is controlled using an adaptive non-maximal suppression algorithm. In a tested embodiment, MOPS-based matching of images matching is achieved using a fast nearest neighbor algorithm that indexes features based on their low frequency Haar wavelet coefficients. In one embodiment, an outlier rejection procedure is used to verify pairwise feature matches based on a background distribution of incorrect feature matches. Feature matches are then refined using RANSAC.

However, it should be noted that there are a large number of conventional feature extraction techniques for use in image matching. The Keyframe Stitcher described herein is adaptable for use with most such conventional feature extraction techniques, and is not intended to be limited to the use of the MOPS technique described above. However, for purposes of explanation, the following discussion will generally refer to the use of the aforementioned MOPS technique in extracting features from images.

3.5 Efficient Match Structures:

As noted above, the number of frames in a video sequence can rapidly increase to thousands of image frames in a very short period of time. Therefore, in order to avoid matching all pairs of frames, some assumption about the correlation between temporal and spatial adjacency must be made. However, any such correlations assumptions should be limited so as to avoid overly constraining the users' capture of image sequences. Further, one advantage of the Keyframe Stitcher is that the mosaicing framework described herein defers aligning the images until after the matching is done, thereby allowing the Keyframe Stitcher to align images with more matches before images with fewer matches, thereby improving the overall quality of the resulting mosaic.

In order to maintain a robust mosaicing technique, the basic assumption made by the Keyframe Stitcher is that most temporally adjacent frames are also spatially adjacent. The Keyframe Stitcher therefore first looks for matches between all pairs of temporally adjacent images. Local matches between such pairs are then used to select keyframes based on the amount of overlap (or in one embodiment whenever a total number of frames exceeds a predetermined threshold without identifying a new keyframe). To do this, the Keyframe Stitcher starts by defining the first and last frame to be keyframes. The Keyframe Stitcher then steps though the video (or other image sequence) labeling frames as key frames if they do not overlap the most recently labeled key frame by some threshold (on the order of about 50% in a tested embodiment). Intermediate frames not labeled as key frames are matched to their temporally neighboring key frames and intermediate frames. A "keyframe mesh" is then created by matching all pairs of key frames.

The assumption underlying this approach is that neighboring key frames almost completely overlap the panorama. In general, though, there will be portions of the panorama that are not covered by any keyframes and that will therefore be left out of the matching. However, as the overlap threshold is set tighter, these potentially unmatched areas become smaller. On the other hand, if the camera path travels over the panorama many times, several keyframes can be associated with the same portion of the panorama. This will cause more matches to be tried when generating the keyframe mesh than if the camera had panned over the panorama once. Therefore the user pays a computational cost penalty for covering the panorama more than once. While it is possible to prune keyframes that overlap other keyframes as a result of passing over the same portions of a scene more than once, the Keyframe Stitcher instead processes all frames to increase accuracy of the overall mosaicing process.

As noted above, matching of images is used to construct a "match structure" which includes a "keyframe mesh." In general, the first step in constructing this mesh is to identify the keyframes in a sequence of image frames. In identifying these keyframes, the first and last frames of the sequence are set as keyframes. The entire image sequence is then evaluated to identify the remaining keyframes (either as a function of frame overlap or number of intervening frames) between the first and last frame. Once the keyframes have been identified, the entire image sequence is evaluated, as described in further detail below, to construct the match structure relative to the identified keyframes.

Figure 5A:
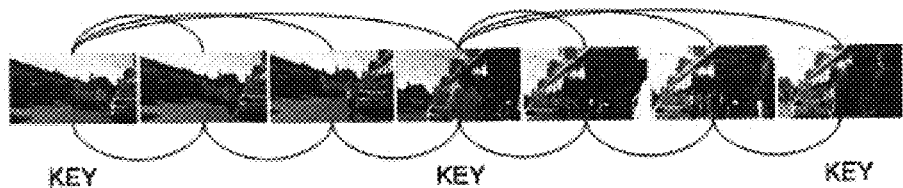
FIG. 5A provides a sequence of images, with lines showing initial image matching sequence performed by the Keyframe Stitcher, wherein image frames are matched to their sequential neighbors and to the immediately preceding keyframe (with each keyframe being identified here as "KEY").
Figure 5B:
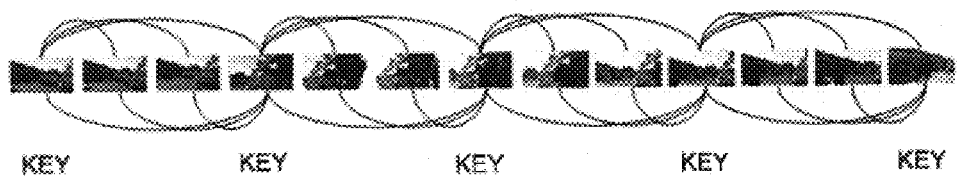
FIG. 5B provides a sequence of images, with lines showing forward matching to subsequent additional key frames from each intermediate (non keyframe) frame (with each keyframe being identified here as "KEY") in addition to the matches illustrated in FIG. 5A.
Figure 5C:
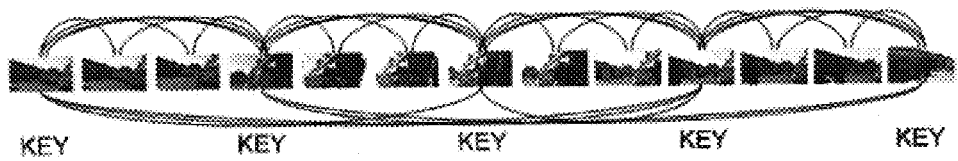
FIG. 5C provides the sequence of images of FIG. 5B, with lines showing matches between keyframes (with each keyframe being identified here as "KEY") in addition to the matches illustrated in FIG. 5B.

For example, as illustrated by the sequence of image frames provided in FIG. 5A, the first and last frames of the sequence are identified as keyframes, and any intervening frames qualifying as keyframes are also identified as keyframes (indicated as "KEY" in FIG. 5A). As shown by the curved connecting lines on the upper portion of FIG. 5A, each image frame (including keyframes) is then matched to the immediately preceding keyframe. Further, as illustrated by the curved connecting lines on the lower portion of FIG. 5A each image frame is also matched to its immediately neighboring image frames. As noted above, matching is performed as a function of the "interest points" or "features" extracted from every image frame.

Next, the Keyframe Stitcher continues the matching process by performing "forward matching" of the image frames. In particular, as illustrated by the curved connecting lines on the lower portion of FIG. 5B, during the forward matching, each image frame (including keyframes) is matched to the immediately preceding keyframe (indicated as "KEY" in FIG. 5B).

Finally, in the last step in constructing the match structure, the Keyframe Stitcher generates a "keyframe mesh" by matching all of the keyframes to every other keyframe. For example, as illustrated by the curved connecting lines on the lower portion of FIG. 5C, during the construction of the keyframe mesh, each keyframe (indicated as "KEY" in FIG. 5C) is matched to every other keyframe in the image sequence. Note that some keyframe-to-keyframe matching is already performed as a function of the first two matching steps described above with respect to FIG. 5A and FIG. 5B. It is not necessary to repeat matches that have already been computed. However, any keyframe matches that were computed prior to the explicit keyframe-to-keyframe matching step are still included in the separate keyframe mesh which is used for several purposes, including mapping of action shots for animated panoramas.

The match structure construction process described above can be summarized in the following steps:

1. Mark first and last image frames as keyframes
2. For each image frame:
   a. Extract interest points
   b. Match to previous frame
   c. Match to previous keyframe
   d. Estimate overlap with previous keyframe
      i. Mark as a keyframe if overlap is too low
   e. Optionally mark as a keyframe if too many image frames without a new keyframe based on overlap.
3. For each frame:
   a. Match to the next or "forward" key frame
4. For each key frame:
   a. Match to all other key frames 5. Optionally compress match measurements comprising the match structure (as described in further detail below)
6. Estimate image orientations from match structure (or compressed match measurements)

Figure 6:
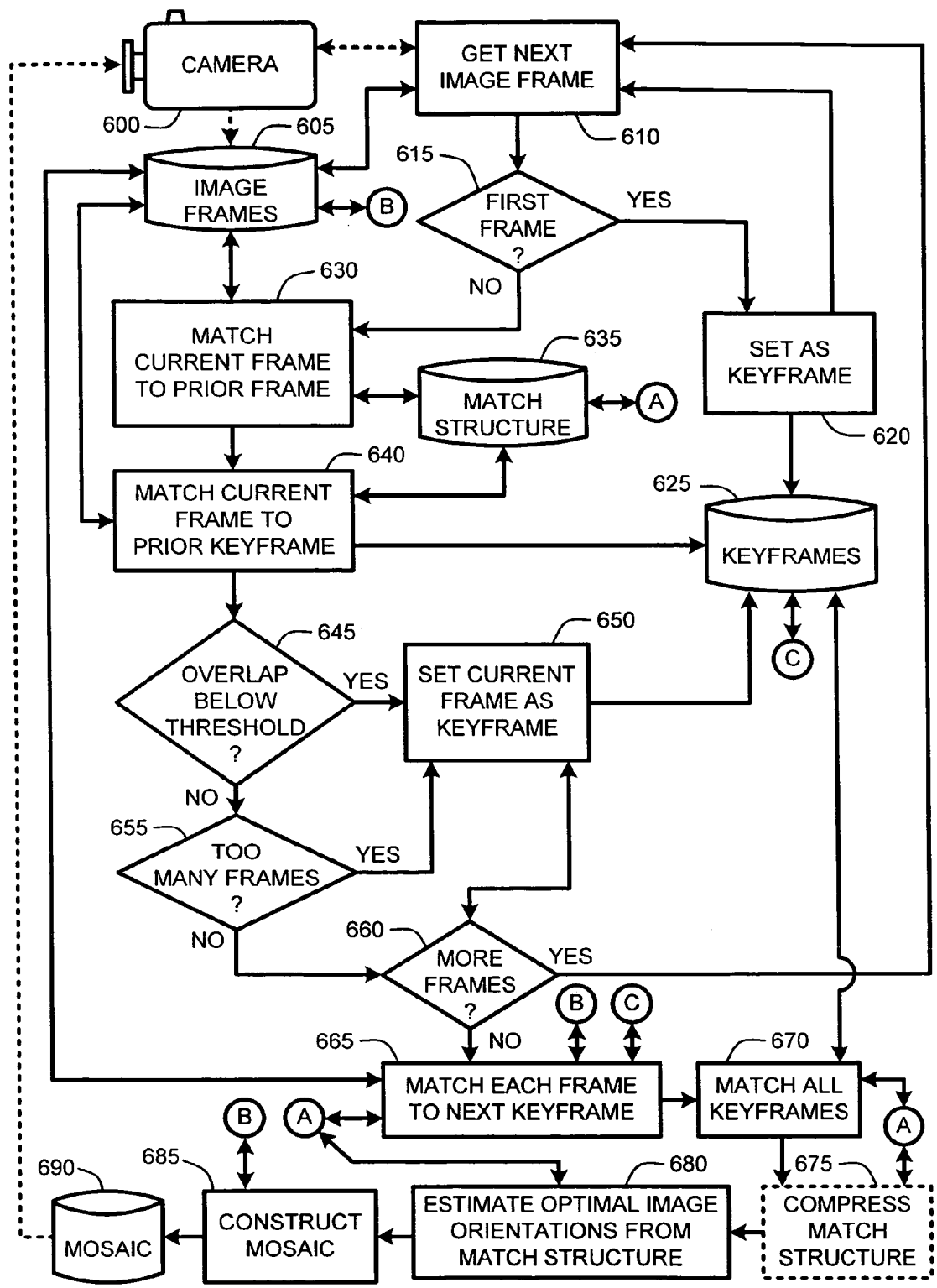
FIG. 6 illustrates an exemplary flow diagram which illustrates an exemplary operational flow of one embodiment of a Keyframe Stitcher, as described herein.

This process is generally illustrated by FIG. 6, which provides an exemplary operational flow of one embodiment of a Keyframe Stitcher, as described herein. It should be noted that any boxes that are represented by broken or dashed lines in FIG. 6 represent alternate embodiments of the Keyframe Stitcher, and that any or all of these alternate embodiments, as described below, may be used in combination with other alternate embodiments that are described throughout this document.

In general, as illustrated by FIG. 6, the Keyframe Stitcher described herein begins operation by retrieving a set of images frames 605 that are either pre-recorded, or provided as live input from a video camera 600 or other image input source. In particular, the Keyframe Stitcher begins be getting a next image frame 610 from the camera 600 or prerecorded image frames 605.

If the current image frame of the image sequence 605 is a first image frame 615, it is identified 620 as a keyframe 625. If the current frame is not a keyframe 625, then it is matched 630 to the prior image frame 605 (which may or may not also be a keyframe). This match information is then stored as a part of the overall match structure 635. Next, the current image frame is matched 640 to the immediately prior keyframe 625. Again, this match information is then stored as a part of the overall match structure 635.

A determination is then made as to whether a computed overlap between the current frame and the preceding keyframe is below a predetermined threshold 645. If the overlap is below that threshold 645, then the current frame is identified 650 as a keyframe 625. Alternately, if too many frames have been processed without a new frame being identified as a keyframe based on overlap, then, in one embodiment, the current frame is identified 650 as a keyframe 625.

In general, this matching process (630 and 640) and keyframe identification process (645, 650, and 655) then continues until the entire image sequence has been processed, and there are no more image frames 660 (with the last frame also being identified as a keyframe 650). However, in the case of real-time processing, whenever the current frame is identified 650 as a keyframe, then that frame is provisionally treated as a "last frame" 660, and processing of the image sequence continues for completing the overall match structure 635.

In particular, whether the entire image sequence 605 has been processed (up to box 660), or whether real-time processing of blocks of image frames bounded by keyframe pairs is being used, construction of the match structure continues by matching 665 each frame 605 to the next or "forward" keyframe 625. This match information 665 is then stored as a part of the overall match structure 635. Note that connection to match structure 635 from box 665 is illustrated by the symbol (A) so as to provide a more legible figure. Similarly, connections to the images frames 605 and keyframes 625 are illustrated by the symbols (B) and (C), respectively so as to provide a more legible figure.

Next, all of the keyframes 625 are matched 670. In the case of real-time processing, this match consists of matching the current keyframe pair to each other, and to prior keyframes or keyframe pairs, if any. This match information 670 is then stored as a part of the overall match structure 635. However, it should be noted that this particular match information 670 also represents the aforementioned "keyframe mesh" which is used in generating animated mosaics, as described in further detail below. Note that connection to match structure 635 from box 670 is also illustrated by the symbol (A) so as to provide a more legible figure.

Next, in one embodiment, the overall match structure 635 is compressed 675 (as described in further detail in Section 3.6) to provide for a reduction in computational overhead when estimating 680 optimal image orientations from the match structure 635.

Finally, given the estimated 680 optimal image orientations, image 605 registration and alignment is performed (via scalings, warpings, rotations, etc.), along with optional conventional blending, feathering, contrast and brightness adjustments, de-ghosting operations, etc., for constructing 685 the mosaic 690 which is then stored for later use. Further, in the case of real-time mosaic generation, the mosaic 690 is provided back to the camera 600 display in near-real-time for viewing by the user while the user is capturing images.

Figure 7:
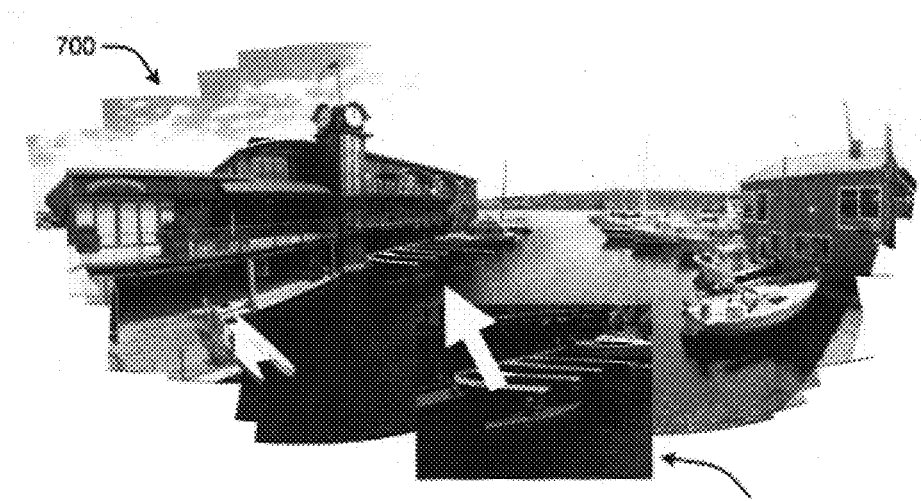
FIG. 7 illustrates a static mosaic panorama generated using the Keyframe Stitcher, with an overlay of dynamic video frames warped and mapped to static mosaic panorama to create a dynamic mosaic panorama.

Examples of various animated and static panoramas are provided in FIG. 7 through FIG. 13, as described below:

In particular, FIG. 7 illustrates a static mosaic panorama 700 generated using the Keyframe Stitcher, with an overlay of dynamic video frames 710 warped and mapped to static mosaic panorama to create a dynamic mosaic panorama. Note that in FIG. 7, the overlay of dynamic video frames 710 has been enlarged and offset with a large white arrow pointing to the location where it is to be mapped into the overall static mosaic. In operation, this enlargement and offsetting is not how the animated mosaic is constructed. Specifically, this enlargement and offsetting is provided as an example of where action shots are mapped since otherwise it would not be possible to clearly differentiate frames which are warped and mapped as an overlay to the overall static mosaic in a single image such as FIG. 7.

Figure 8:
FIG. 8 through FIG. 13 illustrate various examples of mosaic panoramas generated by the Keyframe Stitcher from unique video sequences.
Figure 9:
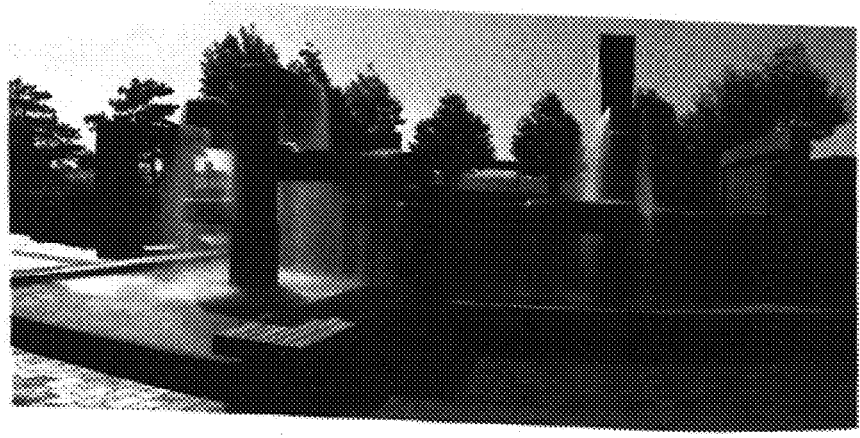
Figure 10:
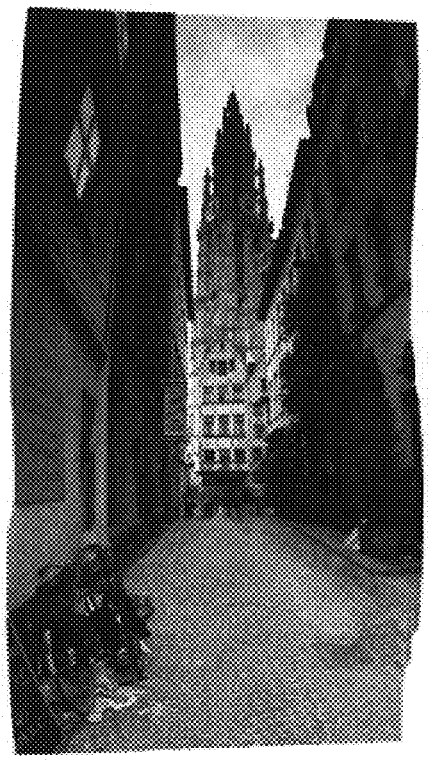
Figure 11:

FIG. 8 and FIG. 9 illustrate examples of un-cropped mosaic panoramas that were generated from continuous video sequences having on the order of about 1000 frames or so at a resolution of about 720×1280 pixel resolution. Similarly, FIG. 10 (568 mosaiced frames) and FIG. 11 (568 mosaiced frames), also provide examples of mosaic that were created from continuous video sequences captured in a single swath (continuous sweep of the camera).

Figure 12:
Figure 13:

Finally, FIGS. 12 and 13 illustrates examples of panoramas that were generated from video sequences captured in a multiple separate swaths (three in each case). In each case, more than a 1000 images were combined to generate each of the mosaics. It should be noted that in the case of multiple swaths, better results were observed by setting the overlap threshold for keyframe detection to a lower level than in the case of continuous swaths where temporal and spatial overlap is naturally more consistent.

3.6 Match Structure Compression:

Once feature matches have been established between pairs of images, they can be used to estimate the camera orientations. Each feature match defines a measurement error that depends on the relative orientations of the pair of images. The relative camera orientations are estimated by minimizing the measurement error in a (robustified) least-squares framework. Conventional interest point detectors will typically extract several hundred features from each image, resulting in hundreds of matches between matched image pairs with large overlaps. If the matched features are well distributed across the image, this strongly constrains the relative orientations of the images. However, the large number of measurements is a computational bottleneck for many image sequences.

Consequently, in one embodiment, the Keyframe Stitcher addresses this computational bottleneck by automatically replacing the measurements between a pair of images with a much smaller number of "representative measurements."

Figure 14A:
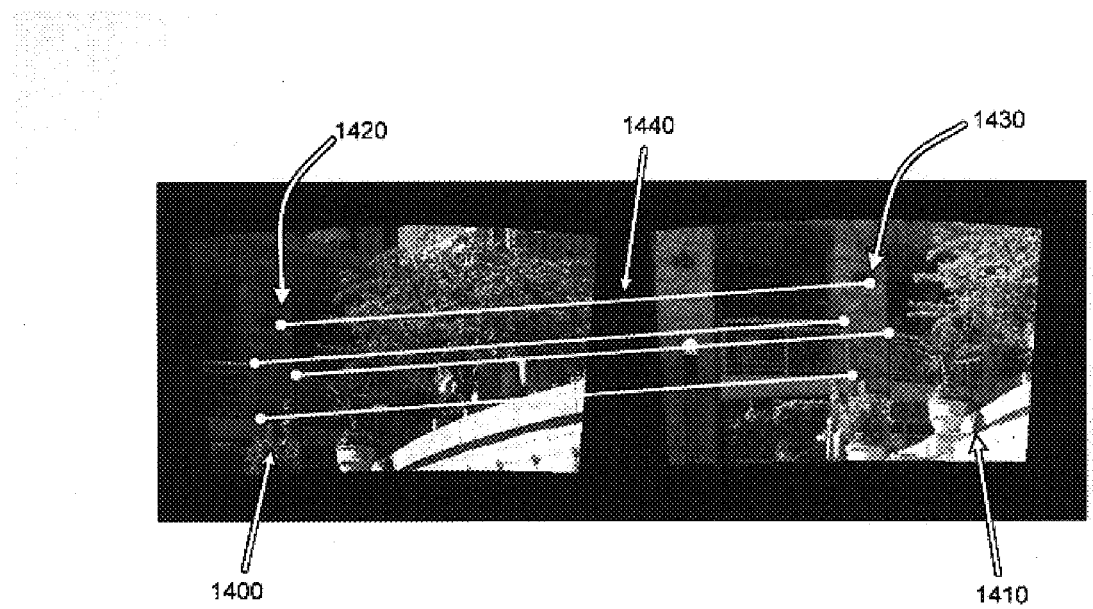
FIG. 14A illustrates a pair of images having matching feature points in a small angular window of each image.
Figure 14B:
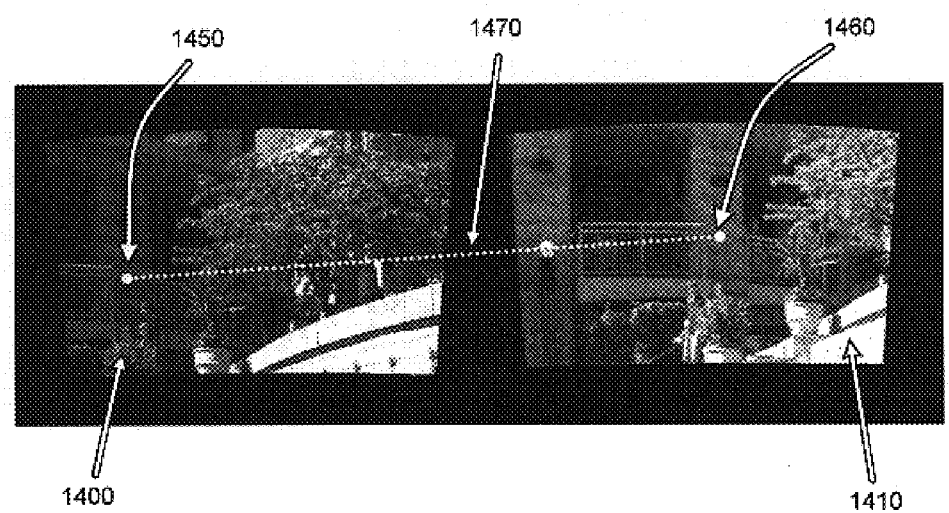
FIG. 14B illustrates the pair of images of FIG. 14A, showing a compression of the matching feature points resulting from replacing sets of matching feature point measurements with corresponding representative measurements.

For example, as illustrated by FIG. 14A, a pair of images 1400 and 1410 may have a set of matching feature points 1420 and 1430, respectively across small windows in each image. Note that the correspondence between particular feature points in image 1400 and image 1410 is illustrated via the use of solid connecting lines 1440 from the feature points 1420 in the first image to the matching feature points 1430 in the second image. Next, as illustrated by FIG. 14B, in accordance with the preceding discussion, the group of feature points 1420 in image 1400 are analyzed to create a single representative measurement 1450. Similarly, also as illustrated by FIG. 14B, the group of feature points 143 in image 1410 are analyzed to create a single representative measurement 1460. This pair of representative measurements, 1450 and 1460, is then used to replace the corresponding sets of feature points, 1420 and 1430, respectively, thereby compressing the total number of feature points. Note that the dashed line 1470 illustrates the correspondence between the representative feature points, 1450 and 1460, in images 1400 and 1410.

In particular, in one embodiment, both the original and new measurements are represented by pairs of image points and 2×2 covariance matrices. The new measurement is set to the centroid of the original points and the covariance is adjusted by summing the inverse covariance matrices.

By replacing the original measurements with a smaller number of representative measurements, the Keyframe Stitcher changes the shape of the error surface while significantly reducing computational overhead. However, an accuracy penalty exists for the reduced computational cost. To minimize the accuracy loss, measurements which span only small portions of the image are merged. Measurements that span a small angular window poorly constrain the parameters of a homography other than the translational component. Representing a group of points by their centroid discards the constraints they provide on the non-translational components of the warp required to align images. Therefore, only allowing points to merge if they have a small extent (i.e., by using the small angular window) reduces the amount of information that is being discarded, and therefore minimizes the error resulting from discarding that data.

In general, measurements to be merged are selected by placing a predetermined bound on the window size they span in either image. Starting with all the measurements in one group, the Keyframe Stitcher recursively splits along the largest axis-aligned dimension (in either image) until the bound is met in both images for all groups. For each group, a single measurement is then created in each image positioned at the centroid of the group. More sophisticated techniques (e.g., k-means clustering) may also be used in alternate embodiments, as such techniques may potentially satisfy the bound constraint with fewer clusters. However, the procedure described above performs well and generally requires a relatively insignificant amount of computational overhead to compute.

In a tested embodiment, an evaluation was made of the accuracy of merging measurements and approximating them with a single point by compressing measurements with a range of bounding box sizes. In particular, the results of sweeping the maximum bounding box size from 0% (no compression) to 50% (up to one point in each quadrant of the image) were observed. This sweep was run on three unique image sequences. The results of this analysis showed that a window size on the order of about 20% seems to provide good performance results relative to both computational overhead and accuracy. Note that with the tested image sequences, a window size on the order of about 20% corresponded to about 25 matches between fully overlapping images and about 12 matches between images that overlap by 50%. Since only 2 measurements are needed to estimate a rotation and zoom between two images, a window size on the order of about 20% seems to be a good number to start with. However, the window size may need to be smaller for warps such as homographies where the minimum number of required matches is larger.

Clearly, there are other ways to reduce the number of measurements considered in each image matching iteration. For example, in one embodiment, each matched pair of images can be aligned and a linear approximation to the error can then be used to create a single, linear measurement connecting the two images. However, there are benefits to using several representative 2D points (i.e., the representative measurements" described above). First, it is possible to preserve some of the non-linearity of the error surface without needing to have the images aligned before simplifying the representation (using the compression technique described above). Second, there are a number of conventional techniques that have been designed to speed up sparse non-linear minimization code to estimate optimal camera orientations. These techniques for speeding up optimal camera orientation estimates are easily adapted for use with the compression techniques described above. In particular, it is simply a matter of compressing the measurements between the matching and alignment steps.

3.7 Computational Overhead

Using the aforementioned matching structure and compressed measurements, camera orientations that minimize the measurement error or objective function are estimated using a second order, non-linear technique such as the conventional Newton-Raphson technique. For P image pairs with $M_i$ measurements between pair i, the objective function being minimized is:

$$\chi^2 = \sum_{i \in P} \sum_{j \in M_i} e_{ij}^T \Sigma_{ij}^{-1} e_{ij} \qquad \text{Equation 1}$$

Here, $e_{ij}$ is the 2D measurement error due to match j in pair i and $\Sigma_{ij}^{-1}$ is a 2×2 measurement covariance. $e_{ij}$ depends on measurement ij and the relative orientations of the images in pair i. In one embodiment, the Keyframe Stitcher uses the following symmetric warping function:

$$e_{ij} = w(x_{ij}, p_i) - w^{-1}(x_{ij}^1, p_i) \qquad \text{Equation 2}$$

where, w( ) is the warping function, $x_{ij}$ and $x_{ij}^1$ are the points in each image being warped and $p_i$ represents a vector of warp parameters. Note that $p_i$ represents a "halfway" warp between the images in pair i. Further, in the case of a rotational panorama with a single unknown focal length, this means that the error is calculated on an image plane rotated halfway between the two images, with the warp function given by Equation 3, where:

$$w\left(x_{ij}, [\omega^T, f]^T\right) = \pi\left(K(f)R(\omega)K^{-1}(f)\begin{bmatrix}x_{ij} \\ 1\end{bmatrix}\right) \qquad \text{Equation 3}$$

where $\pi([x, y, z])^T = [x/z, y/z]^T$, $R(\omega)$ is the halfway rotation matrix, and K() is the calibration matrix:

$$K(f) = \begin{bmatrix} f & 0 & p_x \\ 0 & f & p_y \\ 0 & 0 & 1 \end{bmatrix} \quad \text{Equation 4}$$

Note that homographies, 2D similarities, and rotation only motion models result in different forms of w( ).

At each iteration of the minimization of the objective function (i.e., optimization of orientations), the gradient and Hessian of the objective function, g and H respectively, are calculated and used to solve for an update step. Using a linear approximation for $e_{ij}$, the g and H are given by $$g = \frac{\partial x^2}{\partial \theta} \quad \text{Equation 5}$$
$$H = \frac{\partial^2 x^2}{\partial \theta \partial \theta^T}$$

and the update step, δ, is obtained by solving:

$$H\delta = -g \quad \text{Equation 6}$$

The Hessian H is a sparse Nd×Nd matrix, where N is the number of cameras and d is the number of parameters used to represent each camera (e.g., d=3 for a rotating camera). The computational cost of calculating g and H is linear in the number of measurements since each measurement term in Equation 1 only depends on single pair of images.

For panoramas in which there are measurements between all pairs of images, solving Equation 6 is cubic in N. However, when there are only connections between a small subset of all image pairs, the sparsity pattern of H is represented by a sparse matrix having a pattern similar to the graph illustrated in FIG. 15. As is well known to those skilled in the art, conventional "bundle adjustment" techniques can be used to take advantage of the sparsity of H to reduce the computational complexity of solving Equation 6, by using an LU decomposition, to only cubic or less in the number of keyframes and linear in the number of intermediate frames. By permuting the parameters of the keyframes to the end, the number of non-zero entries, or fill-ins, can be limited when factoring H. An example of the sparsity pattern of the factored Hessian from the image sequence used to construct the mosaic of FIG. 8 is shown in FIG. 16.

Figure 15:
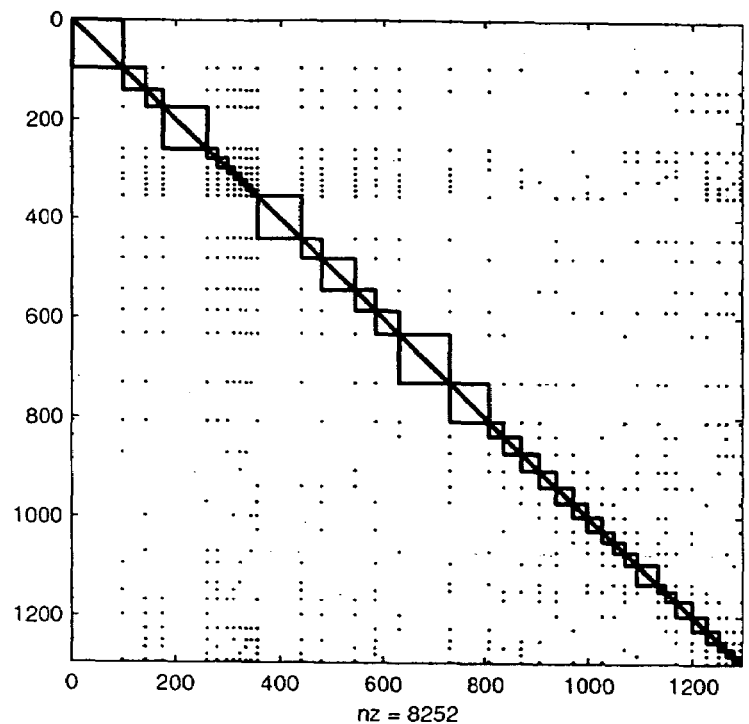
FIG. 15 provides a graph which illustrates that for a mosaic in which there are only connections between a small subset of all image pairs, the sparsity pattern of the Hessian, H, is represented by a sparse matrix having a pattern similar to the graph of FIG. 15.
Figure 16:
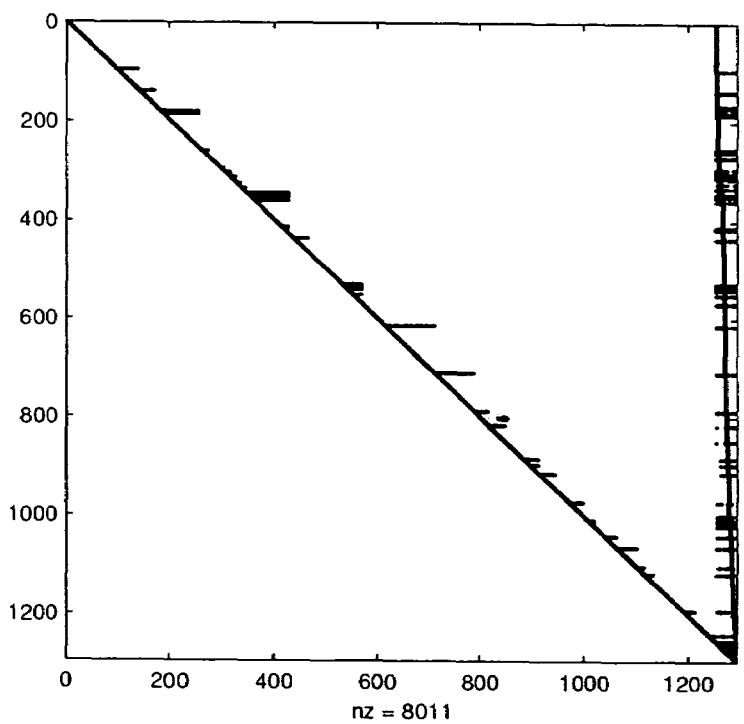
FIG. 16 provides a graph which illustrates that the sparsity of the Hessian for a particular video sequence, as illustrated by FIG. 15, may be leveraged to reduce the computational complexity of optimizing image orientations by permuting the parameters of the keyframes to the end, thereby limiting the number of non-zero entries, or fill-ins, when factoring the Hessian during optimization operations.

In other words, FIG. 15 shows matched frames from the image sequence used to generate the mosaic of FIG. 8, and, equivalently, the sparsity pattern of the Hessian. Point (i, j) is filled in if matches were found between image i and j. Temporal neighbor matches show up as a line down the diagonal. The forward and backward matching to keyframes show up as boxes on the diagonal, with longer camera pauses generating larger boxes (i.e., more feature point matches, assuming that the camera is recording image frames at a constant rate). The key frame to key frame matches show up as sparse off-diagonal points. Since the camera was panning slowly in one direction in the subject image sequence, the keyframe to keyframe matches between temporally distant frames are outliers which were rejected during the robust optimization. The graph illustrated in FIG. 16 shows the sparsity pattern of the factored Hessian after permuting the keyframes to the end. The key frames cause fill-ins in the bottom right corner and up the right side.

The number of matching image pairs is at most quadratic in the number of key frames (if they all overlap each other), but more typically linear; it is also linear in the number of intermediate frames. The number of feature matches per image pair is a scalar multiplier on this portion of the computational cost. In many cases, the cost of summing the contributions of the measurements dominates the computational cost of solving the sparse linear system in the motion parameters. Reducing the number of per-image measurements in such cases using feature match compression has been observed to provide substantial computational savings at little cost in accuracy.

The foregoing description of the Keyframe Stitcher has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the Keyframe Stitcher. It is intended that the scope of the invention be limited not by this detailed description, but rather by the claims appended hereto.

What is claimed is:

1. A computer readable medium having computer executable instructions for automatically generating mosaic images, said computer executable instructions comprising:
    identifying a set of feature points for each image of a set of sequential images of a scene;
    constructing a match structure of image correspondences from the set of feature points identified for each image;
    compressing the match structure by automatically replacing one or more subsets of the sets of feature points with a representative measurement;
    estimating optimal image registrations from the compressed match structure; and
    constructing a static mosaic image from the set of images as a function of the estimated optimal image registrations.

2. The computer readable medium of claim 1 wherein constructing the match structure of image correspondences further comprises:
    identifying the first and last image frames of the set of sequential image frames as a keyframe;
    for each image frame, identifying feature point matches to an immediately preceding image;
    for each image frame, identifying feature point matches to an immediately preceding keyframe;
    for each image frame, estimating an amount of overlap with the immediately preceding keyframe and setting that image frame as a new keyframe if the estimated amount of overlap is below a predetermined threshold;
    for each frame, identifying feature point matches to an immediately succeeding keyframe and
    for each keyframe, identifying feature point matches to every other keyframe.

3. The computer readable medium of claim 2 wherein constructing the match structure of image correspondences further comprises for each image frame, estimating an amount of overlap with all preceding keyframes and setting that image frame as a new keyframe if the estimated amount of overlap with all keyframes is below a predetermined threshold.

4. The computer readable medium of claim 2 wherein constructing the match structure of image correspondences further comprises setting an image frame as a new keyframe if a predetermined maximum number of image frames has been exceeded without identifying a new keyframe as a function of the estimated amount of overlap.

5. The computer readable medium of claim 2 wherein the feature point matches between each of the keyframes comprises a "keyframe mesh."

6. The computer readable medium of claim 4 further comprising generating an animated mosaic image by:
   registering a sub-sequence of image frames to the static mosaic as a function of the keyframe mesh; and
   sequentially mapping the registered subsequence of images as a dynamic overlay to the static mosaic during playback of the animated mosaic image.

7. A system for generating mosaic images from at least one set of sequential images of a scene, comprising using a computing device to perform steps for:
   receiving at least one set of sequential image frames of a scene;
   identifying the first and last image frames of each set of sequential image frames as a keyframe;
   extracting a set of feature points from each image;
   for each image frame, identifying feature point matches to an immediately preceding image;
   for each image frame, identifying feature point matches to an immediately preceding keyframe;
   for each image frame, estimating an amount of overlap with the immediately preceding keyframe and setting the frame as a new keyframe if the estimated amount of overlap is below a predetermined threshold;
   for each frame, identifying feature point matches to an immediately succeeding keyframe;
   for each keyframe, identifying feature point matches to every other keyframe;
   generating a match structure from all of the feature point matches;
   estimating optimal image registrations from the match structure; and
   constructing a static mosaic image from the estimated optimal image registrations.

8. The system of claim 7 further comprising steps for compressing the feature point matches of the match structure by automatically selectively replacing one or more sets of feature point matches between one or more pairs of images with a representative measurement corresponding to the replaced set of feature point matches.

9. The system of claim 7 wherein the feature point matches between each of the keyframe comprises a "keyframe mesh."

10. The system of claim 9 further comprising steps for generating an animated mosaic image comprising steps for:
    registering a sub-sequence of image frames to the static mosaic as a function of the keyframe mesh; and
    mapping the registered subsequence of images as a dynamic overlay to the static mosaic.

11. The system of claim 7 further comprising steps for generating the static mosaic in real-time by sequentially performing the steps of the system of claim 7 on each of a plurality of sets of image frames bounded by immediately neighboring keyframes.

12. The system of claim 7 further comprising steps for setting an image frame as a new keyframe if a predetermined maximum number of image frames has been exceeded without identifying a new keyframe as a function of the estimated amount of overlap.

13. The system of claim 11 wherein the wherein the steps of claim 11 are performed within a self-contained video camera having an integral display device for displaying the static mosaic in real-time.

14. A computer-readable medium having computer-executable instructions for implementing the steps of the system of claim 7.

15. A method for automatically generating a mosaic image from a sequential set of images of a scene, comprising:
    receiving set of images of a scene;
    evaluating each image as it is received to identify a set of feature points for each image;
    building a match structure of image correspondences as a function of the feature points identified for each image, said match structure including matches between image frames identified as keyframes, matches between groups of neighboring non-keyframe image frames, and matches between each non-keyframe image frame and the keyframe immediately preceding and succeeding each non-keyframe image frame;
    estimating optimal image registrations from the match structure; and
    constructing a static mosaic image from the set of images as a function of the estimated optimal image registrations.

16. The method of claim 15 further comprising compressing the match structure prior to estimating the optimal image registrations by automatically selectively replacing one or more sets of feature point matches between one or more pairs of images with a representative measurement corresponding to the replaced set of feature point matches.

17. The method of claim 15 wherein the matches between image frames identified as keyframes comprise a "keyframe mesh" and wherein an animated mosaic image is constructed by:
    registering a sub-sequence of image frames to the static mosaic as a function of the keyframe mesh; and
    sequentially mapping the registered subsequence of images as a sequential dynamic overlay to the static mosaic image during playback of the animated mosaic image.

18. The method of claim 15 wherein identifying image frames as keyframes includes at least one of:
    identifying a first and last frame of the sequential set of images of the scene as a keyframe;
    for each image frame, estimating an amount of overlap with the immediately preceding keyframe and setting that image frame as a new keyframe if the estimated amount of overlap with the immediately preceding keyframe is below a predetermined threshold;
    for each image frame, estimating an amount of overlap with all preceding keyframes and setting that image frame as a new keyframe if the estimated amount of overlap with all keyframes is below a predetermined threshold; and
    setting an image frame as a new keyframe if a predetermined maximum number of sequential image frames has been exceeded without identifying a new keyframe.

19. The method of claim 15 further comprising constructing a preview of the static mosaic image in real-time as each image in the set of images is captured by a video camera, and displaying the preview of the static mosaic image in real-time on a display device integral to the video camera.

20. The method of claim 15 further wherein constructing the static mosaic image from the set of images further comprises optimizing the static mosaic image by applying at least one of:
    feathering of overlapping image frames;
    image frame contrast adjustments;
    image frame brightness adjustments; and
    de-ghosting of overlapping image frames.

* * * * *